United States Patent [19]

Sherman

[11] Patent Number: 4,964,622
[45] Date of Patent: Oct. 23, 1990

[54] LEACHING VESSEL AND SLURRY FLOW CONTROL

[75] Inventor: Michael I. Sherman, Glens Falls, N.Y.

[73] Assignee: Kamyr, Inc., Glens Falls, N.Y.

[21] Appl. No.: 390,902

[22] Filed: Aug. 8, 1989

[51] Int. Cl.$^5$ .............................................. C22B 3/02
[52] U.S. Cl. ................................... 266/168; 266/101; 266/170; 423/658.5
[58] Field of Search ..................... 266/101, 168, 170; 75/101 R

[56] References Cited

U.S. PATENT DOCUMENTS

| | | | |
|---|---|---|---|
| 671,028 | 4/1901 | Phillips | 266/101 |
| 3,958,947 | 5/1976 | Robinson et al. | 266/101 |
| 4,501,721 | 2/1985 | Sherman et al. | 423/109 |
| 4,807,854 | 2/1989 | Mitchell | 266/168 |

Primary Examiner—Robert L. Stoll
Assistant Examiner—Steven J. Bos
Attorney, Agent, or Firm—Nixon & Vanderhye

[57] ABSTRACT

A leaching vessel comprises a central outlet in which is situated a multi-bladed pump for pumping slurry from the vessel. An inclined wall adjacent the bottom wall of the vessel surrounds the outlet and has a plurality of apertures. The inclined wall defines with the bottom wall of the vessel a chamber into which cyanide solution is pumped for passage through the apertures into the slurry. The chamber may be sub-divided into radially or circumferentially spaced chambers, or both, with each chamber having a discrete inlet and flow control valve.

18 Claims, 1 Drawing Sheet

LEACHING VESSEL AND SLURRY FLOW CONTROL

BACKGROUND AND SUMMARY OF THE INVENTION

The present invention relates to apparatus for leaching constituents from mineral materials and particularly relates to apparatus for distributing a leaching solution in a vessel containing mineral ores and controlling the outflow of slurry, all as part of a countercurrent continuous process for recovering valuable minerals from the ore.

Leaching systems are well known for the recovery of valuable metals from mineral ores. For example, gold or silver has been extracted from ores by leaching the ores with alkaline cyanide solution and oxygen in a continuous process, as contrasted with a batch process. The mineral-containing ore is generally crushed and disposed in a slurry through which the treatment solution, i.e., the cyanide solution, is passed countercurrent to the flow of the slurry. The pregnant leaching solution is usually removed from the top of the vessel and passed through a carbon adsorber, the valuable minerals being subsequently removed from the loaded carbon material.

In prior systems, leaching solution enters the lower end of the tank through the distribution nozzles of a rotary distribution arm. These nozzles, however, are prone to clog and plug, for example, by entry of the slurry from the tank into the nozzles. Plugging of the nozzles deleteriously affects the distribution of the treatment solution in the slurry. That problem and various other problems associated with that type of leaching system were attempted to be solved by an improved system disclosed in U.S. Pat. No. 4,807,854 of common assignee herewith. In that system, a pair of vertically spaced distribution arms are disposed in the vessel, one for distributing a washing solution in the slurry and the other for distributing a cyanide solution into the slurry. Discrete flow paths for the delivery of each of the two different solutions into the slurry through the respective arms are provided. Particularly, each aperture or nozzle in each arm had associated with it a tubing for conveying the solution through a central hub and into the arm. Each aperture and flow path had a flow control valve associated therewith.

As much as that system constituted an improvement over the prior leaching systems, it also imposed certain mechanical problems. For example, problems occurred with respect to the mechanical seals. Also, the need to provide independent tubing to supply each of the apertures through the distribution arm and the rotating central hub of the distribution system provided a relatively mechanically complex system which increased costs. Additionally, a portion of the pregnant leaching solution washed out of the vessel with the slurry, whereby the dissolved mineral could not be recovered. That is, such additional concern involves the washing of the dissolved gold out of the vessel with the slurry rather than flowing the valuable mineral in solution upwardly toward the collection point at the top of the vessel.

According to the present invention, there is provided an apparatus for leaching mineral ores in a continuous countercurrent process to remove the valuable mineral constituents contained in the ore and which reduces the mechanical problems associated with prior systems, as well as improves the distribution of the cyanide leaching solution to minimize the flow of dissolved gold with the slurry and maximize recovery of the pregnant leaching solution. While the apparatus and methods according to the present invention are particularly applicable to the removal of metals, such as gold and silver, from metal-bearing ores containing such metals, they may also be adaptable to other processes, such as the removal of pyritic, organic and sulfite sulfa compounds present in solid carbonaceous fuel of the coal or coke type.

According to one aspect of the present invention, there is provided a vertically disposed treatment vessel for containing a slurry, preferably comprised of mineral-bearing ores, such as gold or silver ore. A slurry outlet is provided at the bottom wall of the vessel and a pump having, for example, auger-type blades, is disposed in the outlet for drawing slurry from the vessel. The pump is also a centrifugal pump for pumping the slurry from the vessel in a radial direction. In conjunction with the pump, there is also provided an inclined wall which extends from the slurry outlet, inclining upwardly toward the outer walls of the vessel to define with the bottom wall of the vessel at least one compartment for receiving treatment solution. Particularly, the inclined wall is provided with a series of apertures and the bottom wall of the vessel is provided with an inlet for the treatment solution, e.g., cyanide solution. With this structure, the cyanide solution is introduced into the compartment through the bottom wall of the vessel and into the slurry through the apertures in the inclined wall. Thus, the introduction of the cyanide solution into the slurry is by way of a static structure which involves no moving parts. Additionally, the apertures can be arranged as desired in the inclined wall to achieve the desired distribution of treatment solution in the slurry. Also, by inclining the wall, the slurry is directed downwardly toward the outlet opening and the pump to facilitate slurry removal.

In a preferred form of the present invention, the compartment below the inclined wall is divided into defined volumes or chambers each provided with a separate inlet and flow control valve for flowing the treatment solution into the chamber and through the apertures associated with that chamber into the slurry. Many different configurations of chambers may be provided. For example, the compartment below the inclined wall can be segregated into two or more concentric chambers, each with its own treatment solution inlet and flow control valve. In another embodiment, the volume below the inclined wall can be divided into circumferentially-spaced chambers, for example, by extending radially from the vertical axis of the vessel and walls forming quadrants. Each quadrant is provided with a separate treatment solution inlet and associated flow control valve. In a still further embodiment, the compartment below the inclined wall is divided into both radially spaced concentric and circumferentially spaced chambers, each being provided with its own inlet and control valve for the treatment solution. In this manner, the distribution of the treatment solution in the slurry is closely controlled such that the flow of the pregnant solution containing the dissolved gold toward the top of the vessel and the collection point therefor is facilitated. While certain of the treatment solution may flow upwardly through the apertures into contact with the slurry and then immediately downwardly along the inclined wall toward the slurry outlet, this loss in treatment solution contains only minimal dissolved gold and is offset by the gain in dissolved gold flowing upwardly in the vessel toward the collection point as a result of the unique treatment solution distribution hereof.

In a preferred embodiment according to the present invention, there is provided apparatus for treating slurries comprising an upright vessel for containing the slurry. Means defining an inlet for flowing a treatment solution into the vessel and into the slurry are provided and include an inclined wall adjacent the bottom of the vessel having a plurality of apertures therethrough, the wall being inclined toward the outlet to deliver slurry thereto. Additional means defining an outlet for the slurry adjacent the bottom of the vessel are also provided. A pump is disposed adjacent the outlet to pump slurry from the vessel through the outlet.

In a further preferred embodiment according to the present invention, there is provided apparatus for treating slurries comprising an upright vessel for containing the slurry. Means defining an inlet for flowing a treatment solution into the vessel and into the slurry are provided and include an inclined wall adjacent the bottom of the vessel having a plurality of apertures therethrough. Additional means defining an outlet for the slurry adjacent the bottom of the vessel are also provided. The inlet defining means includes means defining a plurality of discrete chambers below the inclined wall, with each chamber lying in communication with at least an aperture and each chamber having a discrete treatment solution inlet.

Accordingly, it is a primary object of the present invention to provide novel and improved apparatus for improving the distribution of the treatment solution in a vessel to enhance the flow of the valuable mineral constituent in solution by using a static mechanical distribution structure, and simultaneously facilitating the flow of slurry from the vessel.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
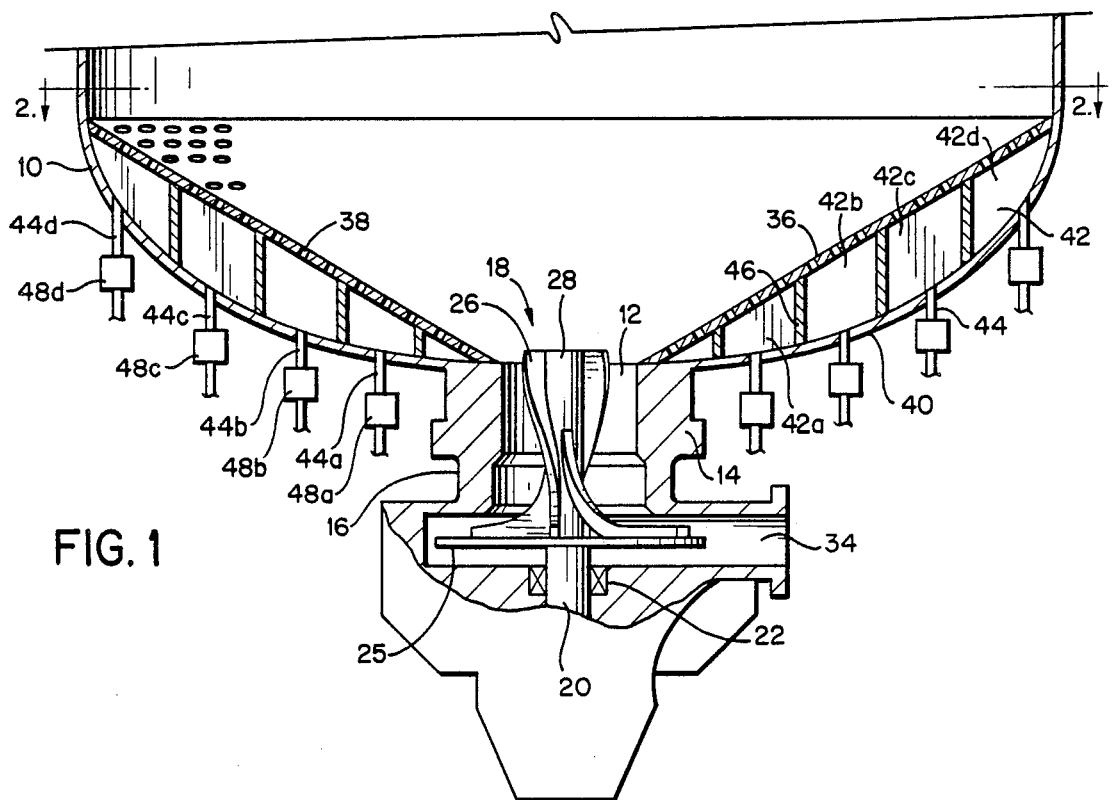
FIG. 1 is a fragmentary cross-sectional view of the lower portion of a leaching vessel illustrating the static structure for flowing treatment solution into the vessel and removing slurry from the vessel in accordance with the present invention.

Referring now to the drawings, particularly to FIG. 1, there is illustrated a leaching reactor vessel or tank, designated 10. A mineral-containing ore slurry is continuously conveyed into vessel 10 from a location adjacent its upper end, not shown, for flow downwardly through the vessel and through a slurry outlet, indicated 12. A treatment solution, for example, a cyanide leaching solution, is introduced into the vessel adjacent its lower end by means to be described in the ensuing description, for flow countercurrent to the flow of the slurry in the tank. Pregnant leaching solution is withdrawn from the top of the vessel, by means not shown, for passage to a carbon adsorber and for ultimate recovery of the valuable metal constituent. For example, a cyanide treatment solution is used to dissolve gold in a slurry of gold-bearing ore and the gold in solution is removed from the vessel for passage through a carbon adsorber for recovery thereof, the mechanism for recovery being disclosed in U.S. Pat. No. 4,501,721.

Figure 2:
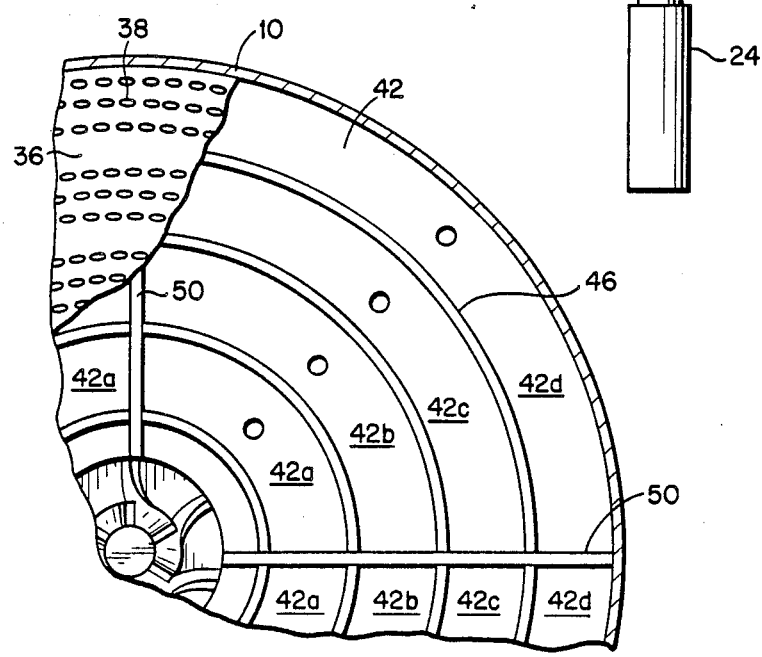
FIG. 2 is a fragmentary cross-sectional view thereof taken generally about on lines 2—2 in FIG. 1 and with portions of the inclined wall removed to illustrate the arrangement of the underlying chambers.
Figure 3:
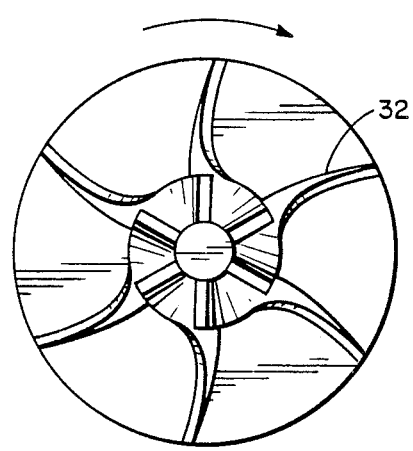
FIG. 3 is an enlarged plan view of the pump for removing the slurry.

Surrounding the opening 12 adjacent the bottom of vessel 10 is a sleeve 14, to which in turn is secured an underlying, generally cylindrical outlet manifold 16. The sleeve 14 and manifold 16 together form a housing for a pump 18. The pump is mounted on a shaft 20 disposed through suitable bearings 22 in manifold 16 and is driven by a conventional drive motor 24. Pump 18 includes a generally horizontally extending flat plate 25 and a plurality of impeller blades 26 disposed about a hub 28. The impeller blades 26 are generally spirally or helically wound about the hub 28, terminating at their lower ends adjacent flat plate 25 in radially outwardly extending vanes 32. As best seen in FIG. 2, the vanes 32 are curved slightly in the direction of rotation of the impeller to pump the slurry passing through the outlet 12 through a radial discharge 34. Consequently, it will be appreciated that the slurry is drawn into the outlet 12 by the action of the pump and passed radially outwardly through discharge 34.

Adjacent the bottom of vessel 10, there is provided an inclined wall 36 in the form of a frustoconical surface having its inner lower edge terminating adjacent outlet 12. Inclined wall 36 extends from outlet 12 upwardly to join with the side walls of vessel 10. A plurality of apertures or openings 38 are provided in the inclined wall 36. It will be appreciated that the inclined wall 36 forms with the bottom wall 40 of vessel 10 a closed annular chamber 42. One or more inlets 44 may be provided through bottom wall 40 in communication with the chamber 42 for flowing treatment solution, i.e., a cyanide solution, into chamber 42 and through the apertures 38 into the slurry in the vessel 10.

In a preferred embodiment of the present invention, there is provided a multiplicity of chambers in compartment 42. For example, the chambers may be formed by a series of concentric walls 46, dividing the compartment 42 into a series of concentric chambers 42a, 42b, 42c and 42d. These concentric chambers are further sub-divided into a plurality of chambers by the provision of radially extending walls intersecting the concentric walls 46. Preferably, four walls 50 extend radially such that the radially spaced chambers formed by the concentric walls 46 are likewise circumferentially spaced from corresponding chambers in adjacent quadrants. Each chamber is preferably provided with one or more inlets 44a, 44b, 44c and 44d and each inlet is provided with a flow control valve 48a, 48b, 48c and 48d. By selectively adjusting the flow through each of the inlets by operation of the flow control valve, the cyanide solution may be adjustably and selectively distributed into the slurry. Also, the number and distribution of the apertures through the inclined wall may be different from chamber to chamber to obtain a desired flow of treatment solution.

It will be appreciated that it is within the scope of the present invention that the annular chamber 42 formed between the inclined wall 36 and the bottom wall 40 of vessel 10 may constitute a single chamber with one or more inlets for flow of cyanide solution through the apertures of inclined wall 36 into the slurry. Preferably, however, the annular chamber is compartmentalized. This may be provided solely by the concentric walls 46 whereby a plurality of concentric annular chambers, each with one or more discrete inlets 44 and flow control valves 48, are provided and without the radially extending walls 50 further sub-dividing the concentric chambers. Conversely, the compartmentalization may be achieved by providing solely the radially extending walls 50 whereby pie-shaped circumferentially spaced chambers are provided, each with one or more discrete outlets 44 and flow control valves 48. Other configurations of the compartmentalized chamber 42 will be readily apparent to those skilled in this art. It will be appreciated that, depending upon the nature of the chambers formed, the flow of treatment solution through the chambers and the apertures associated therewith can be controlled selectively to achieve the proper distribution thereof in the slurry. Moreover, such distribution can be controlled as desired to increase or decrease the flow of treatment solution through selected chambers and into the slurry.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for treating slurries comprising:
   an upright vessel for containing the slurry;
   means defining an inlet for flowing a treatment solution into the vessel and into the slurry including an inclined wall adjacent the bottom of the vessel, said inclined wall having a plurality of apertures therethrough;
   means defining an outlet for the slurry adjacent the bottom of said vessel; and
   a pump disposed to pump slurry from the vessel through said outlet;
   said wall being inclined toward said outlet to deliver slurry thereto.

2. Apparatus according to claim 1 wherein said pump includes a rotatable shaft and a plurality of pump blades carried by said shaft.

3. Apparatus according to claim 2 wherein said blades are generally circumferentially spaced one from the other and generally helically arranged about an axis.

4. Apparatus according to claim 2 wherein said outlet defining means defines a vertical axis, said pump shaft being carried by said vessel for rotation of said blades about an axis generally coincident with said vertical axis.

5. Apparatus according to claim 4 wherein said blades are generally circumferentially spaced one from the other, said pump being located in said outlet.

6. Apparatus according to claim 5 wherein said pump has a flat plate generally perpendicular to said axis and a plurality of blades extending radially along said flat plate for discharging slurry in a direction generally normal to said axis.

7. Apparatus according to claim 1 wherein said inlet defining means includes means defining a plurality of discrete chambers below said inclined wall, with each chamber lying in communication with at least an aperture and each chamber having a discrete treatment solution inlet.

8. Apparatus according to claim 7 including a flow control valve for each discrete treatment solution inlet for regulating the flow of treatment solution into the corresponding chamber.

9. Apparatus according to claim 7 wherein said vessel is generally circular in cross-section and said chamber defining means includes a plurality of generally concentric walls defining generally concentric chambers.

10. Apparatus according to claim 7 wherein said vessel is generally circular in cross-section and said chamber defining means includes a plurality of generally radially extending walls defining chambers spaced circumferentially one from the other.

11. Apparatus according to claim 10 wherein said chamber defining means includes a plurality of generally concentric walls intersecting said radially extending walls thereby defining both circumferentially and concentrically spaced chambers below said inclined wall.

12. Apparatus according to claim 11 including a flow control valve for each discrete treatment solution inlet for regulating the flow of treatment solution into the corresponding chamber.

13. Apparatus for treating slurries comprising:
    an upright vessel for containing the slurry;
    means defining an inlet for flowing a treatment solution into the vessel and into the slurry including an inclined wall adjacent the bottom of the vessel, said inclined wall having a plurality of apertures therethrough for flowing treatment solution into said vessel;
    means defining an outlet for the slurry adjacent the bottom of said vessel;
    said inlet defining means including means defining a plurality of discrete chambers below said inclined wall, with each chamber lying in communication with at least an aperture and each chamber having a discrete treatment solution inlet.

14. Apparatus according to claim 13 including a flow control valve for each discrete treatment solution inlet for regulating the flow of treatment solution into the corresponding chamber.

15. Apparatus according to claim 13 wherein said vessel is generally circular in cross-section and said chamber defining means includes a plurality of generally radially extending walls defining chambers spaced circumferentially one from the other.

16. Apparatus according to claim 13 wherein said vessel is generally circular in cross-section and said chamber defining means includes a plurality of generally radially extending walls defining chambers spaced circumferentially one from the other.

17. Apparatus according to claim 16 wherein said chamber defining means includes a plurality of generally concentric walls intersecting said radially extending walls thereby defining both circumferentially and concentrically spaced chambers below said inclined wall.

18. Apparatus according to claim 17 wherein said inclined wall is spaced above the bottom wall of said vessel and said inlet defining means includes the bottom wall of said vessel as a part of said chambers.

* * * * *